J. J. BERRIGAN.
PRESS.
APPLICATION FILED MAY 25, 1911.

1,018,957.

Patented Feb. 27, 1912.
7 SHEETS—SHEET 1.

Fig. 1.

Witnesses
H. G. Robinette
R. F. Steward

Inventor
John J. Berrigan,
By K. P. McElroy
Attorney

J. J. BERRIGAN.
PRESS.
APPLICATION FILED MAY 25, 1911.

1,018,957.

Patented Feb. 27, 1912.
7 SHEETS—SHEET 2.

Fig 2

Witnesses
H. G. Robinette
R. F. Steward

Inventor
John J. Berrigan
by K. P. McElroy
Attorney

UNITED STATES PATENT OFFICE.

JOHN J. BERRIGAN, OF ORANGE, NEW JERSEY, ASSIGNOR TO KATIE S. BERRIGAN, OF ORANGE, NEW JERSEY.

PRESS.

1,018,957.  Specification of Letters Patent.  Patented Feb. 27, 1912.

Application filed May 25, 1911. Serial No. 629,433.

*To all whom it may concern:*

Be it known that I, JOHN J. BERRIGAN, a citizen of the United States, residing at Orange, in the county of Essex and State of New Jersey, have invented certain new and useful Improvements in Presses, of which the following is a specification.

This invention relates to presses; and it comprises a press having a stationary framework carrying two parallel series of wheels or roller elements mounted in its top, and an endless belt-like element alternately looped above the upper rims of the wheels and below the lower rims of the wheels in successive series, and having a return portion extending through the base of the framework, said belt-like element comprising a pair of parallel linked members, connecting crescent shaped or curved members extending transversely between the linked members, coöperating curved members being alternately fixedly and pivotally secured to said linked members and the shape of such members being such as to produce a press chamber between such coöperating members, and cloth members secured to the coöperating members in such a way as to produce an end wall to such press chamber; and it also comprises certain accessory details of the stated structure; all as more fully hereinafter set forth and as claimed.

In the ordinary types of continuous presses, there are many difficulties experienced, either by reason of friction or inability to secure any high degree of pressure on the material to be pressed, where the latter, as is usually the case with seeds, etc., is in relatively fine shape. With a cone press, the pressing elements must move over the material to be pressed which causes a large absorption of power in overcoming friction, while with belt and roller presses, or roller presses, short material does not enter the "pinch" well where any degree of pressure is exerted. In feeding cotton seed, for example, between a belt and a roll, if there be much pressure the seed refuses to enter the pinch. Another defect in this type of press is the tendency of the cake to be carried up on the roll, and of the expressed liquid to reënter the cake beyond the "pinch."

In certain other and copending applications, Serial No. 514,851, filed August 27, 1909, and Serial No. 566,208, filed June 10, 1910, I have described means and methods for securing a better pressure effect in continuous operation. Briefly described, the process of expression therein described and illustrated comprises providing a revoluble beltlike member with a series of small pockets, depressions, or chambers, placing the pressing member in motion, filling the presser chambers at one end of the apparatus and discharging at the other, and at intermediate points producing a series of alternating lateral compressions and decompressions. The side walls of the press chamber exert a lateral pressure upon the material in the chamber. A single pressure however long continued, does not give as good results as regards expression as a plurality of successively applied compressions with intermediate decompression. Where the pressure is released and the material is allowed to take a new position, a subsequent compression will give more liquid than the same total time of pressure applied as a continuous pressure. In the best form of the invention as disclosed in the stated applications, I provide a beltlike member with a series of transverse slats or ribs forming press chambers between them and curve the beltlike member alternately in a concave curve beneath the roll or wheel and a convex curve over a wheel or roll. This alternation is repeated a plurality of times. In passing under the roll member, the side walls of the press chamber approximate, producing pressure, and in passing over the same they again recede from one another, releasing the pressure. Advantageously, the slats or presser members are carried at their ends by two beltlike linked members passing over sprocket wheels or smooth wheels as the case may be.

The present invention relates to certain improvements in this type of mechanism.

Presses of the type disclosed in said applications and in the present application may, of course, be used for any purpose where expression is desired, as in treating linseed, cotton seed, rape seed, fish, cane bagasse, slurry, etc.

In the accompanying drawings I have shown, more or less diagrammatically, pressing apparatus under the present invention.

In this showing, Fig. 3 is a similar view of a structure somewhat modified.

Figure 1:
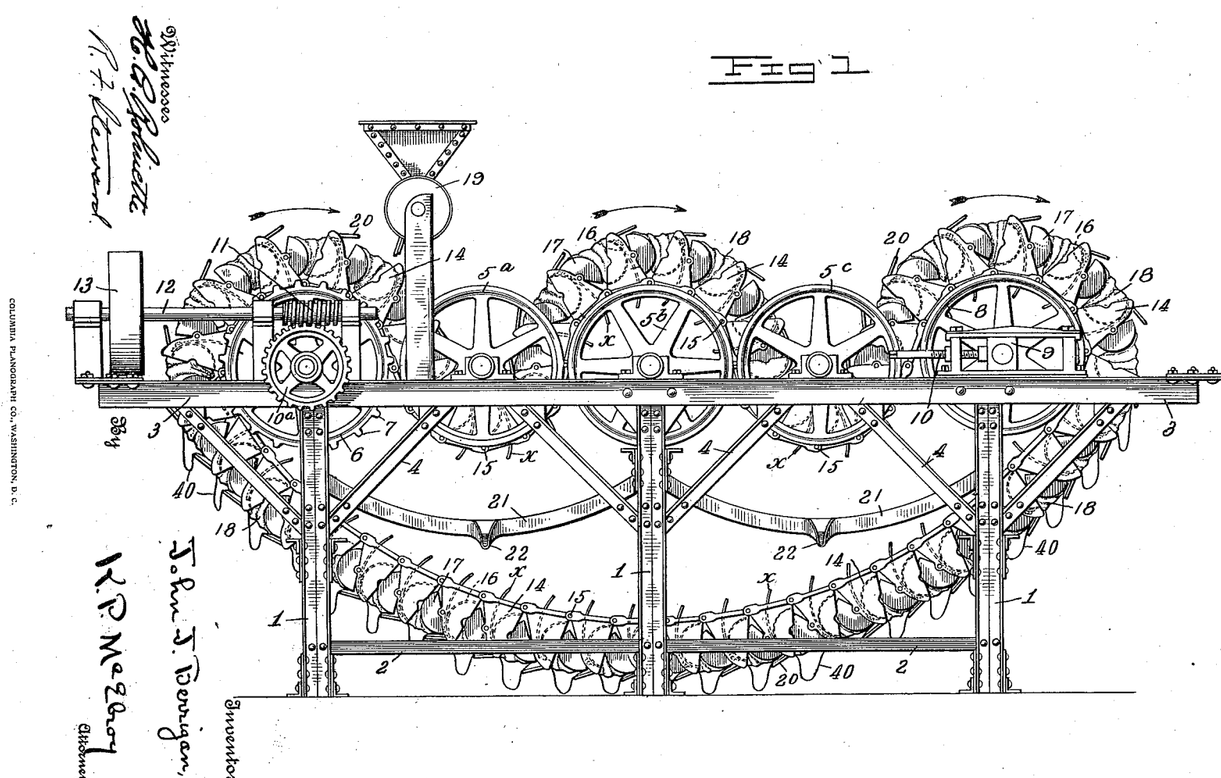
Figure 1 shows in elevation a complete press capable of applying two successive compressions.

In Fig. 1 I have shown as a whole a complete press. For the sake of convenience of illustration on a limited scale, the apparatus has been shown as adapted to form but two compressions and two decompressions. Many more may be used if desired, this being merely a matter of lengthening the apparatus. In this structure, 1 are standards connected by cross pieces 2, carrying longitudinal members 3 and brace pieces 4. These members are most conveniently constructed of iron or steel, but may of course be of wood or any other suitable structural material. Mounted on the longitudinal girders are a series of wheels 5 (6, $5^a$, $5^b$, $5^c$, 8), journaled in appropriate bearings. But one side of the press is seen and on the other side is a similar series of wheels. As shown, these wheels are smooth surfaced, and an end wheel as 6, may be provided with sprocket teeth 7 to act as a drive member. Another end wheel 8 may be journaled in a slidable bearing 9, provided with means 10 for shifting it longitudinally more or less to adjust pressures. The drive wheel is provided with gear $10^a$, worm 11, and drive shaft 12 carrying pulley 13. A series of castings or the like 14 of a generally triangular shape are linked together at their base (see Fig. 2, etc.) to form a beltlike member. The linking may be by a rod 15, the end of which rests on the surface of the presser wheel. This rod extends across the apparatus and serves also to link the corresponding members on the other side. Mounted on these castings are presser elements 16 and 17, the former being rigidly secured and the latter pivotally mounted to act as rockers. These elements will be later described. Between each pair of such elements is a presser chamber provided with end sealing cloth 18. The stated elements are linked into an endless beltlike assemblage which, as shown, is given a series of bends in alternate directions while in pressing position. The rods 15 which it carries first engage between the sprocket teeth of the first wheel, pass below and are carried by the periphery of the next wheel ($5^a$) in series, then above the next wheel in series, below the next in series and finally above the last in series. Passing the last in series, the return bend of the beltlike member passes through the base of the apparatus to the point of beginning. In passing over the first or drive roll, the beltlike member is given a convex bend (that is, an outward bend) and the walls of the press chamber recede from each other, opening up the press chamber. At this point, material to be pressed is delivered from a suitable feed mechanism, 19, into the open press chamber as it passes therebeneath. Guards 20 may be provided for keeping material from falling between the non-coöperating presser members and for diverting it into the press chambers proper. Passing below the next wheel, the walls of the chamber are forcibly brought together and liquid is expressed which drops on pan 21 to be drawn off at 22. Aprons $x$ (see Fig. 9) may be provided to direct the flow. In passing above the next wheel element, the chambers again open up, releasing the pressure on the cake and allowing the cake to fall and tumble and assume a new position. Passing beneath the next revoluble element the pressure is renewed to be again released on passing above the next element in series. As the presser chambers enter on the return bend of the beltlike element after the final decompression, their mouths are downward and the cake falls out.

Figure 2:
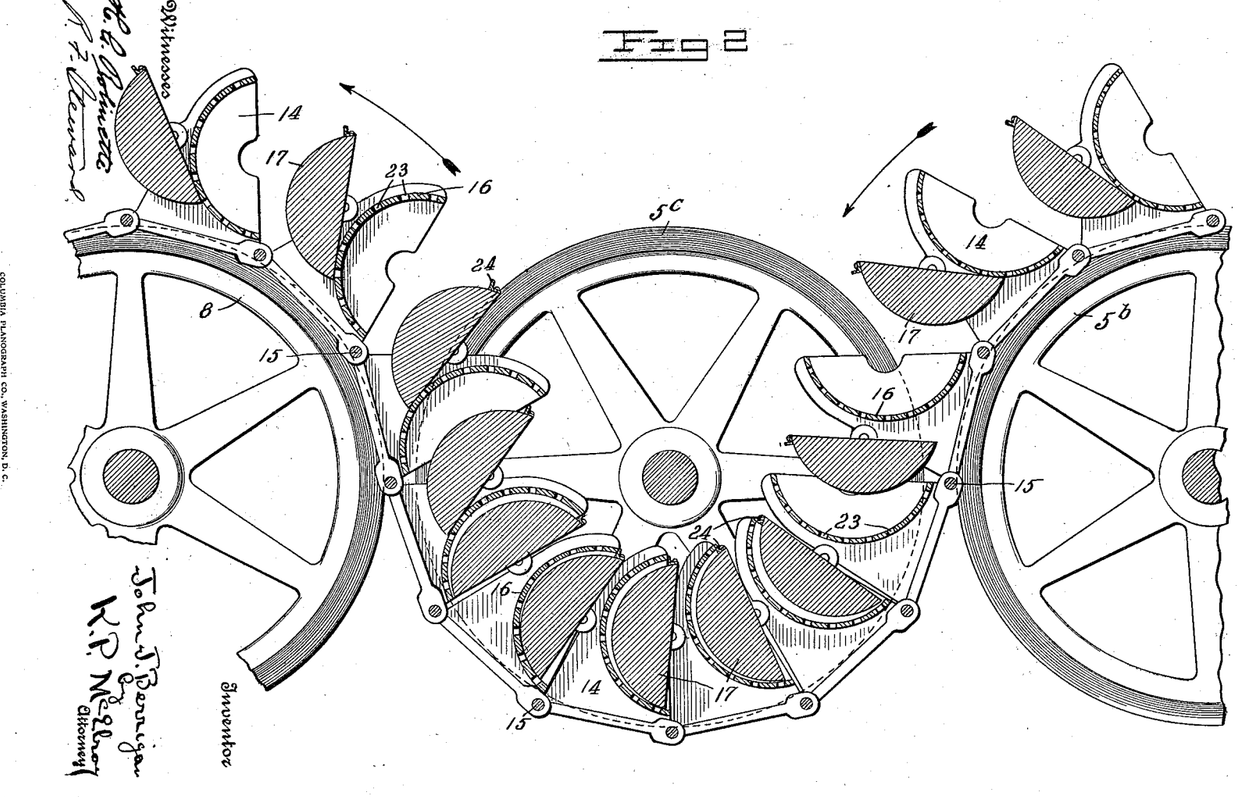
Fig. 2 is a fragmentary view, partly in section and partly in elevation, showing the operation of the presser members.

In the showing of Fig. 2, the described elements are shown on an exaggerated scale.

Fig. 2 may be taken as a view of a longitudinal section taken between the parallel series of wheels and looking in the reverse direction from Fig. 1. The castings, presser elements and rods are the same as in the previous figure. The showing of press cloths and material to be compressed (see Figs. 4 and 5) has been omitted for the sake of clearness. As will be noted, the fixed presser element is perforated as at 23 to allow exit of expressed liquid. It will be noted that the coöperating presser elements (16 and 17) above $5^b$ are widely open and gradually come together as they pass below $5^c$, and at the lowest point reach their close approximation. Each of the rocker presser elements in this showing is provided with a lug or flange 24 at the top which engages with the fixed presser element as the two come together, forming a top seal and operating to give a better engagement between the two elements. This engagement will be seen in the lower presser elements in the middle of the figure. In this figure, elements $5^b$, $5^c$, and 8 are shown so spaced that most of the approximation is produced at the base of $5^c$. The greater the amount of the cake in the presser chamber, the greater will this tendency be.

Figure 4:
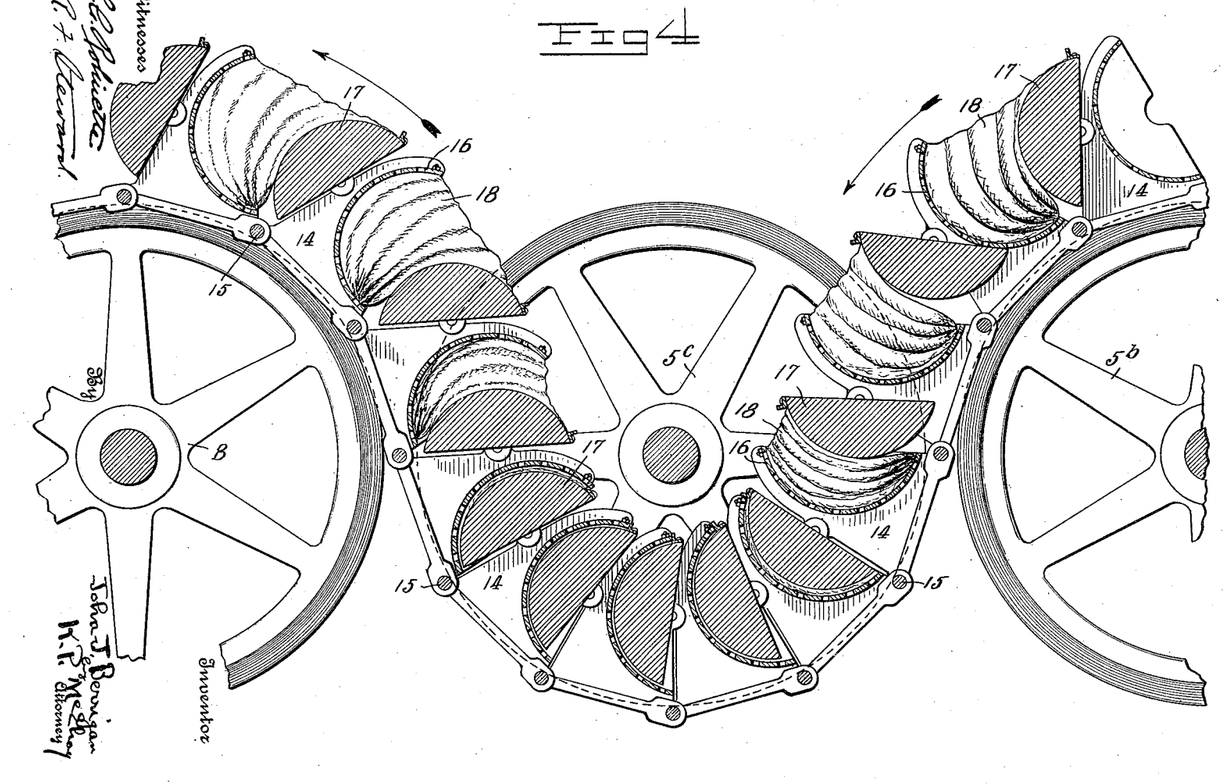
Fig. 4 is a similar view with presser cloths shown.
Figure 10:
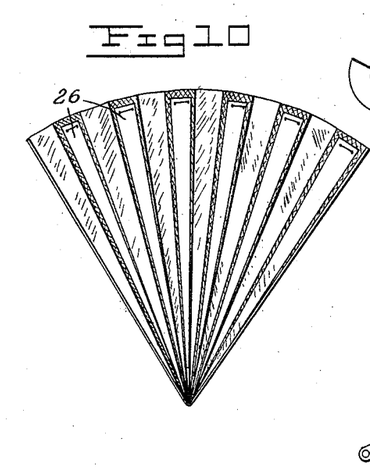
Fig. 10 is a modified form of end seal.

In Fig. 4 the showing is the same save that the press chambers are shown provided with sealing cloth diaphragms 18 at their ends to prevent lateral squeezing out of the cake, as where soft and fluent substances are being treated. This end cloth has accordion folds, or is plaited, and may be reinforced if necessary with strips 26 of metal or other material as shown in Fig. 10. As shown, this end cloth is secured along opposite edges to both members of each pressing pair.

Figure 5:
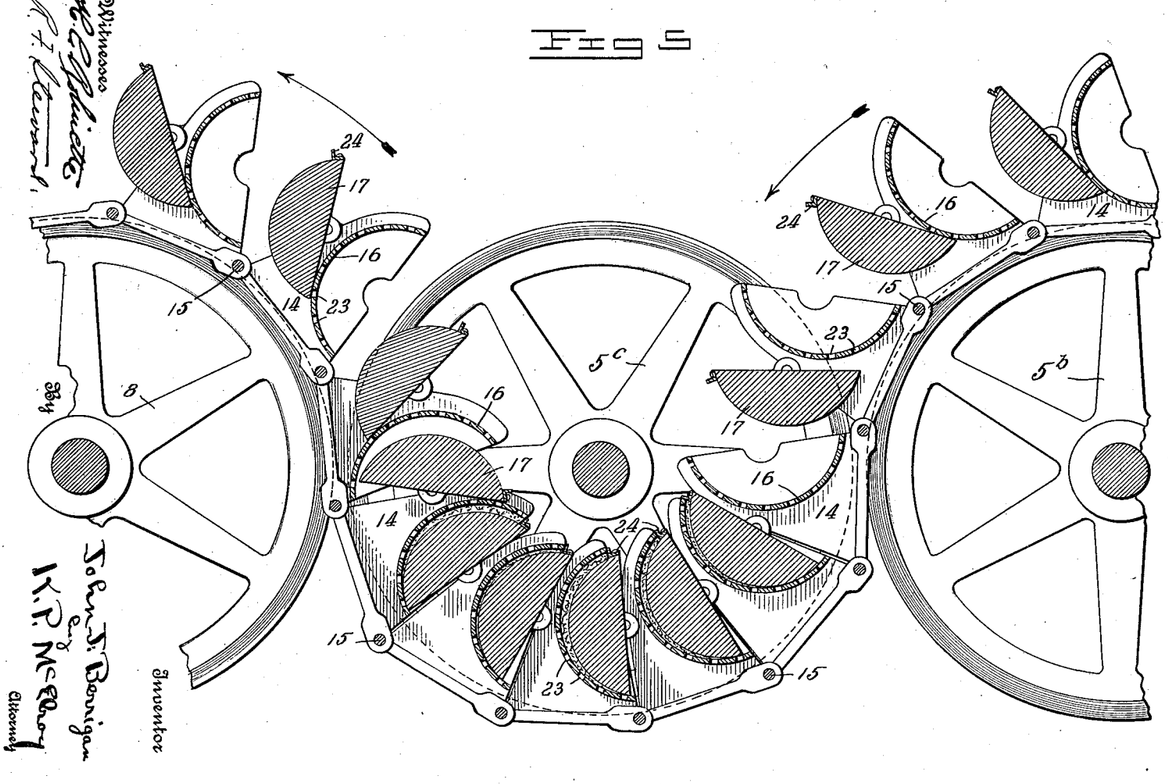
Fig. 5 is a similar view of another modification.

In Fig. 5, 5ᵇ, 5ᶜ and 8 are shown so closely placed together that the pressure begins and ends at a higher point in the concave bend than is the case in Fig. 2. By this arrangement the belt-like member is caused to hug wheel 5ᶜ over a larger part of its circumference, thus producing effective pressure on both the ascending and descending quadrants of 5ᶜ. The showing of the end sealing cloth between the lower press chambers is omitted, as in this position it is not clearly seen.

In Fig. 3 is shown a modified form of certain elements. In this figure, the cloths are also omitted for the sake of clearness. In this modification the rocker presser members are shown pivoted near the base of the fixed presser members. This arrangement is convenient for some purposes, but ordinarily offers no special advantage. The rocker presser members are also shown as provided with arms 27 which are limited in movement by pins 28. As will be seen, in the presser elements rising to ride over 8, this prevents the rocker member remaining in the fixed element too long. The fixed elements in this view are provided with a flange 29 which engages the top of the rocker element when the two elements come together before heavy pressure occurs and prevents the rocker element being forced outward and upward, thus locking the presser elements together. This effect will be seen in the presser chambers below 5ᶜ.

Figure 6:
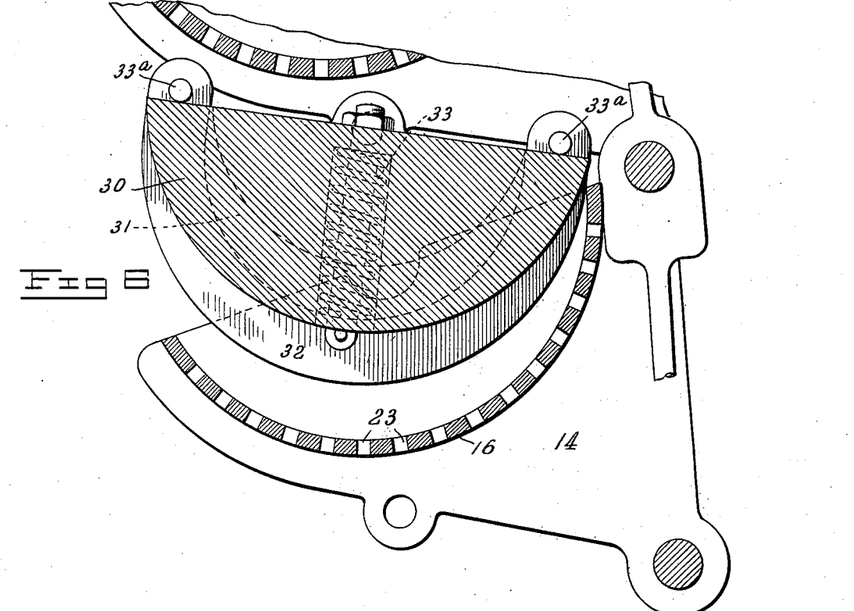
Fig. 6 is an end sectional view, partly in elevation, of a detail.

In Fig. 6 is shown a detail of a modified form of rocker presser element. This rocker presser element here marked 30 is provided with a plurality of grooves 31 (shown in dotted line) within which are ribs 32. Each of these ribs is engaged by a spring pressed member 33, which tends to force the rib outward from the face of the rocker member, such outward movement of the rib being limited by suitable detents as by pins 33ᵃ engaging the opposite faces of the rocker member. As the walls of the presser chamber approach, these spring controlled ribs serve to divide the mass of material to be pressed into a plurality of more or less independent smaller portions, thus distributing the pressure somewhat more uniformly over the presser surfaces. The ribs at the ends of the presser chambers also take a large part of the lateral pressure off the end sealing cloths. When the press members are actually in pressing phase, the movable ribs recede into the grooves in the bodies of the rocker members to some extent. When pressure on the cake is released, the spring controlled ribs emerging from the rocker members push the cloth and contained press cake away from the rocker face, breaking up and redistributing the cake in the pressure chamber. This is conducive to more efficient extraction of liquid in a subsequent pressing phase, and, after the final compression, it aids in freeing the extracted materials from the filter cloth and facilitates the discharge of the press cake.

Figure 7:
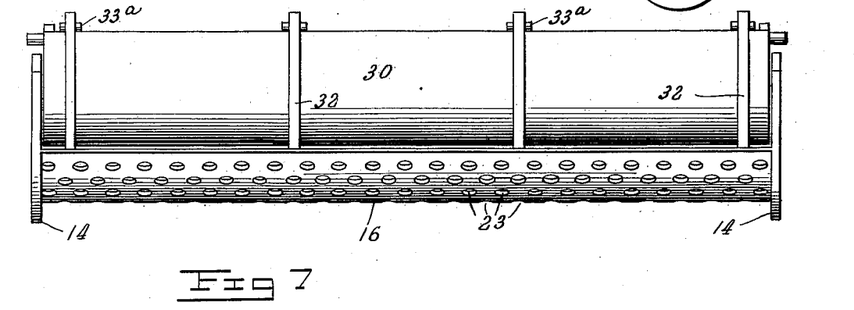
Fig. 7 is a front view of the same.

In Fig. 7 is a front view of such a rocker member coöperating with a fixed member. When the pressure on the cake is relaxed as the beltlike member reverses its curvature, the ribs 32 emerge from the rocker element and help break up the press cake, besides serving to distribute the pressure.

Figure 8:
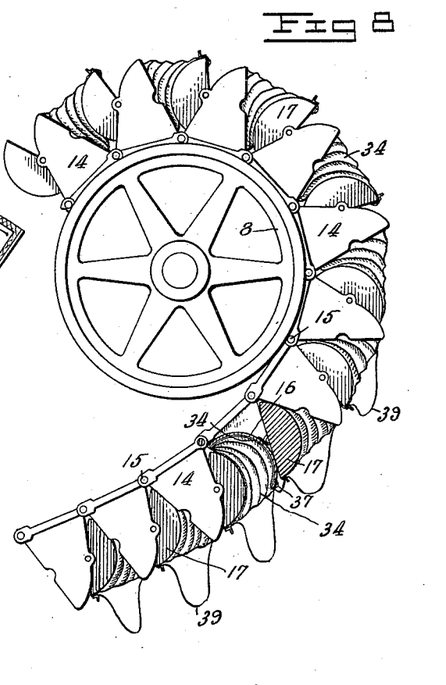
Fig. 8 is another view partly in section showing a method of attaching press cloths and the operation of the same.
Figure 9:
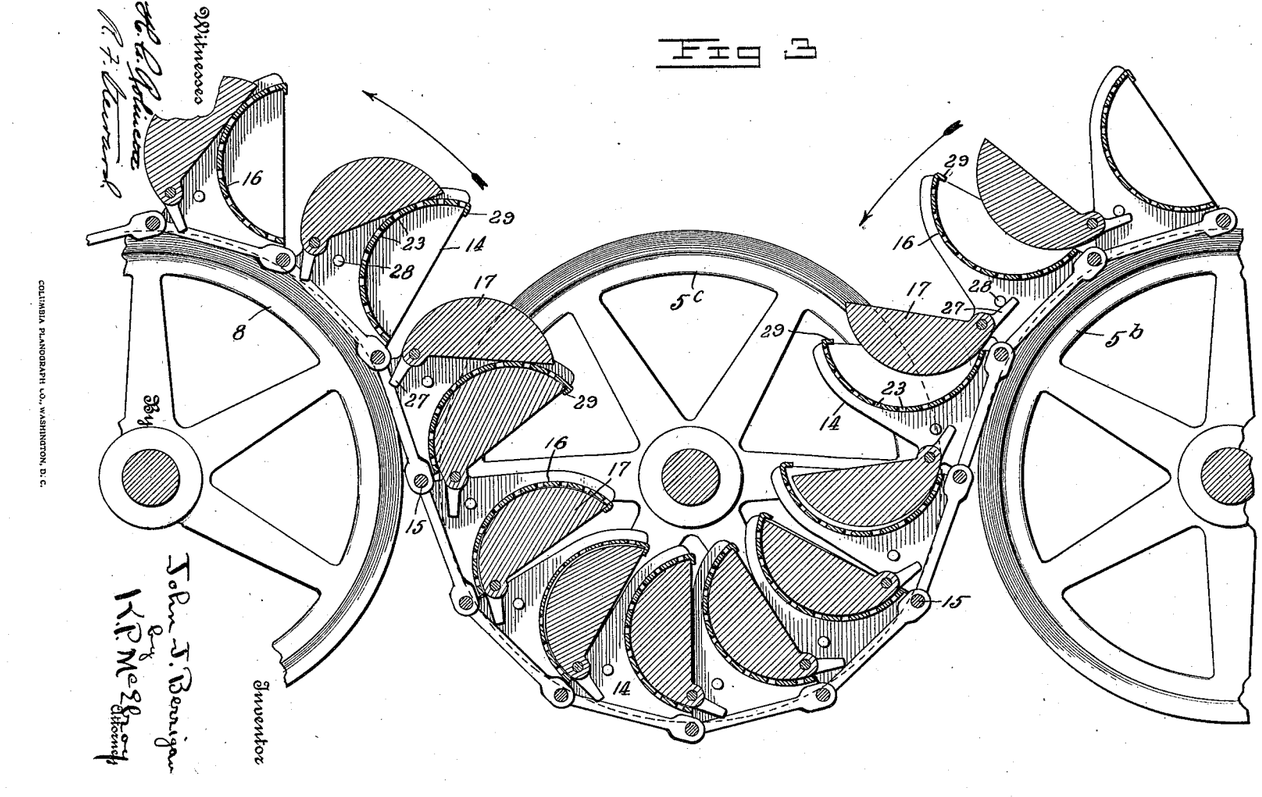
Fig. 9 is a detail on an enlarged scale, partly in section, showing the method of attaching such press cloths.

In Fig. 8 is a fragmentary view showing the positions taken by the press cloths in the return passage of the beltlike element. Between each coöperating pair of presser elements is a relatively fixed cloth 34, which joins the accordion folded element (18) at its ends, and is secured to the fixed presser member as at 35, 36 and 37, and to the rocker element as at 38. This cloth stays in position during the operation of the press. It may be of thick, relatively strong and heavy material, such as heavy canvas. Within it lies another cloth 39 of like material fixed to the two presser elements at its long edges. This cloth, which may be of the cloth used for filter presses, forms a downwardly extending bag within the press chambers in the upper part of the passage of the beltlike member, but in the return passage of such beltlike member it tends to fall downwardly as shown in Figs. 8 and 9, turning inside out and allowing the cake to be dumped. This bag may be washed during the return passage of the beltlike member if so desired. This arrangement of filtering cloths is particularly useful in pressing very finely divided materials such as slimes and the like.

Another and somewhat simpler arrangement of cloths is shown in Fig. 1. In this arrangement the end sealing cloths 18 are attached as above described, but there is no fixed cloth. A single cloth 40 similar to the cloth 39 in Fig. 9 is attached to the presser elements only by its long edges, and bags outwardly from the press chambers after the press cake is discharged.

The weight of the depending return loop of the belt member appears to have considerable influence on the intensity of pressure obtained between the presser members. It is desirable therefore in the present invention to form the rockers 17 solid and imperforate,

What I claim is:—

1. In a press, a plurality of wheel members, an endless beltlike linked carrier member looped therearound to give alternating concave and convex bends and a plurality of pairs of transverse presser members secured to said carrier member, one member of each such pair being imperforate, of a shape approximating a segment of a cylinder and swingably secured to the carrier member and the other being perforate, crescent shaped in section and rigidly attached to said carrier member.

2. As a press element, a pair of coöperating presser bars adapted to form a press chamber therebetween, one of said bars being perforated and of crescent shape and the other being relatively heavier and of imperforate material, said other bar having a curved presser face of shape adapted for coöperation with the crescent bar and being provided with end means allowing a pivotal mounting.

3. As a press element, a pair of substantially triangular carrier members adapted for linking together with similar elements to form beltlike assemblages and a pair of transverse presser bars uniting said carrier elements, one of said bars being perforated, of generally arcuate section and rigidly secured to said carrier members and the other having a curved presser face adapted for coöperation with an arcuate bar, being relatively heavy and imperforate and being pivotally mounted at its ends in said carrier members.

4. As a press element, a plurality of pairs of substantially triangular carrier members linked together at their bases to form a pair of beltlike elements, and a pair of transverse presser bars linking each such pair of carrier elements, one of said bars being perforated, of generally arcuate section and rigidly secured to said carrier members and the other having a curved presser face adapted for coöperation with an arcuate bar, being relatively heavy and imperforate and being pivotally mounted at its ends in said carrier members.

5. As a press element, a plurality of pairs of substantially triangular carrier members linked together at their bases to form a pair of beltlike elements, a pair of transverse presser bars linking each such pair of carrier elements, one of said bars being perforated, of generally arcuate section and rigidly secured to said carrier members and the other having a curved presser face adapted for coöperation with an arcuate bar, being relatively heavy and imperforate and being pivotally mounted at its ends in said carrier members, and means for giving the whole assemblage a concave bend to approximate the arcuate bars and the curved faces of the corresponding pivotally mounted bars and produce compression therebetween.

6. In a press, a plurality of pairs of coöperating transverse presser bars linked at their end to form an endless, beltlike assemblage and spaced apart to form press chambers therebetween, means for concaving said assemblage to produce pressure between said bars and cake retaining means located in said chambers, said means comprising collapsible end walls for said chambers and a U-shaped textile fabric wall between said end walls and along the coöperative faces of said presser bars.

7. In a press, a plurality of pairs of coöperating transverse presser bars linked at their ends to form an endless beltlike assemblage and spaced apart to form press chambers therebetween, means for concaving said assemblage to produce pressure between said bars and cake retaining means located in said chambers, said means comprising collapsible end walls comprising textile fabric for said chambers and a U-shaped textile fabric wall between said end walls and along the coöperative faces of said presser bars.

8. In a press, a plurality of pairs of coöperating transverse presser bars linked at their ends to form an endless, beltlike assemblage and spaced apart to form press chambers therebetween, means for concaving said assemblage to produce pressure between said bars and cake retaining means located in said chambers, said means comprising collapsible end walls for said chambers and a plurality of U-shaped textile fabric walls between said end walls and along the coöperative faces of said presser bars, one of said fabric walls being of relatively strong open-textured material and secured in place and the other being of lighter, closer-textured material and secured at its upper edges to permit outward bagging.

9. In a press, a plurality of pairs of coöperating presser bars of shape adapted to produce arcuate press chambers between each such pair, said plurality being linked at their ends to form an endless, beltlike assemblage and spaced apart to form press chambers therebetween, means for concaving said assemblage to produce pressure between said bars and cake retaining means located in said chambers, said means comprising collapsible end walls for said chambers and a U-shaped textile fabric wall between said end walls and along the coöperative faces of said presser bars.

10. In a press, a plurality of pairs of coöperating presser bars of shape adapted to produce arcuate press chambers between each such pair, said plurality being linked at their ends to form an endless, beltlike assemblage and spaced apart to form press chambers therebetween, means for concaving said assemblage to produce pressure between said bars and cake retaining means located in said chambers, said means comprising collapsible end walls comprising textile fabric for said chambers and a U-shaped textile fabric wall between said end walls and along the coöperative faces of said presser bars.

11. In a press, a plurality of pairs of coöperating presser bars of shape adapted to produce arcuate press chambers between each such pair, said plurality being linked at their ends to form an endless, beltlike assemblage and spaced apart to form press chambers therebetween, means for concaving said assemblage to produce pressure between said bars and cake retaining means located in said chambers, said means comprising collapsible end walls for said chambers and a plurality of U-shaped textile fabric walls between said end walls and along the coöperative faces of said presser bars, one of said fabric walls being of relatively strong open-textured material and secured in place and the other being of lighter, closer-textured material and secured at its upper edges to permit outward bagging.

12. In a press, a plurality of pairs of coöperative presser bars, one such bar being arcuate, perforated and relatively rigidly mounted and the other being heavier, imperforate and provided with endwise pivotal means allowing a rocking movement relative to said arcuate bar, said plurality being linked at their ends to form an endless, beltlike assemblage and spaced apart to form press chambers therebetween, means for concaving said assemblage to produce pressure between said bars and cake retaining means located in said chambers, said means comprising collapsible end walls for said chambers and a U-shaped textile fabric wall between said walls and along the coöperative faces of said presser bars.

13. In a press a plurality of pairs of coöperating presser bars, one such bar being arcuate, perforated and relatively rigidly mounted and the other being heavier, imperforate and provided with endwise pivotal means allowing a rocking movement relative to said arcuate bar, said plurality being linked at their ends to form an endless, beltlike assemblage and spaced apart to form presser chambers therebetween, means for concaving said assemblage to produce pressure between said bars and cake retaining means located in said chambers, said means comprising collapsible end walls for said chambers and a plurality of U-shaped textile fabric walls between said end walls and along the coöperative faces of said presser bars, one of said fabric walls being of relatively strong open-textured material and secured in place and the other being of lighter, closer-textured material and secured at its edges to permit outward bagging.

14. In a press, a framework, a plurality of wheels mounted therein in a horizontal series, and a beltlike assemblage of linked transverse presser members looped about said wheels to give an alternate concave and convex bend or flexure to the upper face of said assemblage, said presser members being in pairs of coöperating bars forming press chambers therebetween and one bar being arcuate and perforated while the other is imperforate, relatively heavy and provided with a curved face shaped for coöperation with said arcuate bar.

15. In a press, a framework, a plurality of wheels mounted therein in a horizontal series, and a beltlike assemblage of linked transverse presser members looped about said wheels to give an alternate concave and convex bend or flexure to the upper face of said assemblage, said presser members being in pairs of coöperating bars forming press chambers therebetween and one bar being arcuate and perforated while the other is imperforate, relatively heavy and provided with a curved face shaped for coöperation with said arcuate bar, said arcuate bar being relatively rigidly mounted and said imperforate bar being pivotally mounted to enable a rocking motion.

16. In a bar press, a presser element consisting of a bar having a face adapted to coöperate with another presser bar, grooves in said face, riblike members mounted in said grooves and yielding means for pressing said riblike members outward.

17. In a bar press, a presser bar having the section of a segment of a circle, transverse grooves on the curved face, riblike elements mounted in said grooves and spring means for pressing said riblike elements outward.

18. In a bar press, a pair of generally triangular carrier elements adapted at their base for linking with similar elements to form beltlike assemblages, a transverse arcuate perforated presser bar fixedly secured to and uniting a pair of such carrier elements, an imperforate presser bar having a curved face adapted to coöperate with an arcuate bar and pivotally secured at its ends to said carrier elements to give it a relative swinging motion and luglike elements on said carriers to restrain its swing in one direction.

19. In a bar press, a pair of generally triangular carrier elements adapted at their base for linking with similar elements to form beltlike assemblages, a transverse arcuate perforated presser bar fixedly secured to and uniting a pair of such carrier elements, an imperforate presser bar having a curved face adapted to coöperate with an arcuate bar and pivotally secured at its ends to said carrier elements to give it a relative swinging motion, projecting lugs on said imperforate bar and coöperating luglike elements on said carriers engaging said lugs to restrain the swing in one direction.

20. In a bar press, a press element comprising a relatively fixed member, a rocker member coöperating therewith, and means to automatically lock said members in pressing relation.

21. In a bar press, a press element comprising a relatively fixed member, a rocker member coöperating therewith, and means carried by said fixed member adapted to lock said rocker member in pressing relation thereto.

22. In a bar press, a press element comprising a relatively fixed member, a rocker member coöperating therewith, and yieldably mounted means carried by said rocker member and adapted to engage the pressing surface of said fixed member.

In testimony whereof, I affix my signature in the presence of witnesses.

JOHN J. BERRIGAN.

Witnesses:
 ALBERT J. SMITH,
 JOHN H. TRENT.

Copies of this patent may be obtained for five cents each, by addressing the "Commissioner of Patents, Washington, D. C."